United States Patent Office 3,388,193
Patented June 11, 1968

3,388,193
PROCESS FOR THE MANUFACTURE OF TETRAETHYL METHYLENE BIS-DITHIOPHOSPHATE
Toshihiro Yamaguchi, Ichikawa-shi, Chiba-ken, and Yoyozo Yamamoto and Kennosuke Imamura, Tokyo, Japan, assignors to Nippon Chemical Industrial Co., Ltd., Tokyo, Japan, a corporation of Japan
No Drawing. Filed June 4, 1964, Ser. No. 372,717
Claims priority, application Japan, June 8, 1963, 38/29,366
5 Claims. (Cl. 260—978)

ABSTRACT OF THE DISCLOSURE

A process for producing tetraethyl methylene bis-dithiophosphate comprising reacting diethyl diethyl dithiophosphoric acid or alkali metal or ammonium salts thereof with methylene sulfate, pre- or in situ formed. Tetraethyl methylene bisdithiophosphate has mitocidal activity.

The present invention relates to a novel process for the manufacture of tetraethyl methylene bis-dithiophosphate such compound exhibiting superior mitocidal activity.

It is known that tetraethyl methylene bis-dithiophosphate represented by the formula:

$$\begin{array}{c} C_2H_5O \\ C_2H_5O \end{array} \!\!\! \diagdown\!\!\! \underset{\|}{P}\!\!-\!S\!-\!CH_2\!-\!S\!-\!\underset{\|}{P} \!\!\! \diagup\!\!\! \begin{array}{c} OC_2H_5 \\ OC_2H_5 \end{array}$$

has a strong contact poisonous activity, particularly as concerns mites generally infesting rice plants and fruit trees.

The compound has been hitherto manufactured by reacting diethyl dithiophosphate with methylene dibromide as shown by the following reaction formula:

$$\begin{array}{c} C_2H_5O \\ C_2H_5O \end{array} \!\!\! \diagdown\!\!\! \underset{\|}{P}\!\!-\!SM + CH_2Br_2 \longrightarrow$$

$$\begin{array}{c} C_2H_5O \\ C_2H_5O \end{array} \!\!\! \diagdown\!\!\! \underset{\|}{P}\!\!-\!S\!-\!CH_2\!-\!S\!-\!\underset{\|}{P} \!\!\! \diagup\!\!\! \begin{array}{c} OC_2H \\ OC_2H_5 \end{array}$$

wherein M is selected from alkali metal or ammonium radicals.

However, methylene bromide which has been employed as the starting material in the prior art is expensive, the only portion of the methylene bromide molecule which is utilized in the production of the tetraethyl methylene bis-dithiophosphate is the methyl radical, and the actual percentage of the methylene bromide which enters into the reaction is only a small percentage. Therefore, the use of methylene bromide is uneconomical.

The object of the present invention is to provide a process in which tetraethyl methylene bis-dithiophosphate can be more economically manufactured in higher yields than is shown by the methods disclosed by the prior art.

The present invention is a novel process for the manufacture of tetraethyl methylene bis-dithiophosphate characterized in that a compound selected from the group consisting of diethyl dithiophosphoric acid and alkali metal and ammonium salts thereof is reacted with methylene sulfate.

In the present invention, compounds which give rise to methylene sulfate under the reaction conditions can be used in place of methylene sulfate as such, i.e., the methylene sulfate can be formed in situ.

The process of the present invention is shown in the following reaction formula:

$$\begin{array}{c} C_2H_5O \\ C_2H_5O \end{array} \!\!\! \diagdown\!\!\! \underset{\|}{P}\!\!-\!SM + (CH_2SO_4)_2 \longrightarrow$$

$$\begin{array}{c} C_2H_5O \\ C_2H_5O \end{array} \!\!\! \diagdown\!\!\! \underset{\|}{P}\!\!-\!S\!-\!CH_2\!-\!S\!-\!\underset{\|}{P} \!\!\! \diagup\!\!\! \begin{array}{c} OC_2H_5 \\ OC_2H_5 \end{array} + 2M_2SO_4$$

wherein M is selected from the group consisting of hydrogen, alkali metal, and ammonium radicals.

The methylene sulfate which may be used in the process of the present invention can be methylene sulfate per se which is manufactured by various known methods, or the methylene sulfate can be formed in the reaction medium while the reaction is carried out. For example, methylene sulfate may be used which has been obtained by adding paraformaldehyde to fuming sulfuric acid to obtain a mixture of methylene sulfate and sulfuric acid and then preferably removing sulfuric acid from the mixture. The removal of sulfuric acid may be carried out by the filtering of mixture, or by the washing of the mixture with a solvent which can dissolve sulfuric acid and is inert for methylene sulfate, such as ether.

Methylene sulfate may be also manufactured by the reaction of sulfuric anhydride with formaldehyde. On the other hand, paraformaldehyde may be mixed with the diethyl dithiophosphoric acid reactant, and sulfuric acid subsequently added, in order to form in situ methylene sulfate which in turn reacts with the diethyl dithiophosphoric acid to produce the tetraethyl methylene bis-dithiophosphate.

In the process of the present invention, alkali metal and ammonium salts of diethyl dithiophosphoric acid can be used in place of diethyl dithiophosphoric acid. The preferable alkali metal is sodium and potassium metals.

Although the process of the present invention can be carried out without the use of solvent, a suitable solvent such as dichloroethane, ether, tetrachloroethane, benzene, etc. may be used.

The present invention is illustrated by the following examples.

Example 1

30 g. of 50% fuming sulfuric acid were heated to a temperature of 60° to 70° C. and then 6 g. of paraformaldehyde were slowly added thereto with agitation which was then continued at the same temperature for about two hours to complete the reaction. The resulting mixture of methylene sulfate and sulfuric acid was thereafter allowed to cool to room temperature.

74.4 g. (0.4 mols.) of diethyl dithiophosphoric acid were charged into a four necked flask having a capacity of 300 ml. and provided with an agitator, thermometer, inlet and tube filled with calcium. The flask was maintained at a temperature of 0° C. to 10° C. in an ice-water bath and was charged with 22.0 g. of methylene sulfate manufactured by the above process, followed by completely washing with ether and by removing sulfuric acid. After the addition of methylene sulfate was completed, the reaction was completed by continuing the agitation at the same temperature for twenty hours.

After the reaction was completed, the reaction product was mixed with 200 ml. of benzene and the mixture was sufficiently shaken to extract the product and to separate sulfuric acid therefrom. The product-containing solution was washed with a 3% aqueous solution of sodium carbonate and then with water, dried by Glauber's salt and thereafter distilled. 70.5 g. of clear pale yellow tetraethyl methylene bis-dithiophosphoric ester were obtained having the following properties: B.P., 145° to 150° C./0.05 mm. Hg; refractive index, $n_D^{20}$ 1.5419; specific gravity. 25/25° C. 1.2346.

Example 2

74.4 g. of diethyl di-thiophosphoric acid were charged into a four necked flask as shown in Example 1 and then were dissolved in 200 ml. of benzene. To the resultant solution was gradually added a mixture of methylene sulfate and sulfuric acid produced by the method shown in Example 1 while the temperature was maintained at a temperature of −5° to 5° C. Thereafter, the reaction was completed by continuing the agitation at the same temperature for fifteen hours. The reaction product, after separating the sulfuric acid therefrom, was washed with 3% aqueous solution of sodium carbonate, with water, dried with sodium sulfate, and then distilled to remove out benzene therefrom. The above-treated reaction product was cooled down to −15° C. to crystallize out bis(diethoxy di-thiophosphonyl)disulfide. The bis(diethoxy di-thiophosphonyl)disulfide product was filtered off and distilled. 65.3 g. of transparent pale yellow tetramethylene bis-dithiophosphoric ester were obtained having the following properties: B.P., 150° to 155° C./0.06 mm. Hg; refractive index $n_D^{25}$ 1.5421; specific gravity 25/25° C. 1.2346.

Example 3

74.4 g. of diethyl dithiophosphoric acid were charged in a four necked flask as shown in Example 1 and then were dissolved in 200 ml. of isopropyl ether.

27.6 g. of anhydrous potassium carbonate were slowly added to the above solution and the solution was heated on a hot bath until the evolution of carbon dioxide gas ceased. The solution was then cooled to −10° to 0° C. and 22.0 g. of methylene sulfate was slowly added with agitation. After addition was completed, the agitation was continued at the same temperature for three hours to complete the reaction. After the reaction was completed, the reaction product was washed with water, dried with sodium sulfate and then distilled. 72.5 g. of transparent pale yellow tetraethyl methylene bis-dithiophosphoric ester were obtained having the following properties: B.P. 135° to 138° C./0.03 mm. Hg; refractive index $n_D^{25}$ 1.5421; specific gravity 25/25° C. 1.2346.

Example 4

200 ml. of 1,1,2,2-tetrachloroethane and 6 g. of paraformaldehyde were charged in a dried four necked flask as shown in Example 1 and 16 g. of liquid anhydrous sulfuric acid were slowly poured in the flask while it was cooled to a temperature of about 0° C. 74.4 g. of diethyl dithiophosphoric acid were poured in the resulting suspension while the same temperature was maintained and the agitation was continued for fifteen hours to complete the reaction. Sulfuric acid was separated from the reaction product by a separating funnel and the reaction product was washed successively with 3% aqueous sodium carbonate and water, dried with sodium sulfate and distilled. 49.5 g. of tetraethyl methylene dithiophosphoric ester were obtained having the following properties: B.P. 135° to 137° C./0.03 mm. Hg; refractive index $n_D^{25}$ 1.5427, specific gravity 25/25° C. 1.2337.

Example 5

74.4 g. of diethyl dithiophosphoric acid, 6 g. of paraformaldehyde and 200 ml. of 1,2-dichloroethane were charged to a four necked flask as shown in Example 1 and 16 g. of liquid anhydrous sulfuric acid were slowly poured in the flask with agitation while it was cooled to about 0° C. to 10° C. to effect reaction. Agitation was continued for fifteen hours at the same temperature to complete the reaction. Sulfuric acid was thereafter separated from the reaction product by a separating funnel. The reaction product was washed successively with a 3% aqueous solution of sodium carbonate and water, dried with sodium sulfate and distilled. 68.3 g. of tetraethyl methylene dithiophosphoric ester were obtained having the following properties: B.P. 135° to 139° C./0.04 mm. Hg; refractive index $n_D^{25}$ 1.5421; specific gravity 25/25° C. 1.2340.

Example 6

86.0 g. of the ammonium salt of diethyl dithiophosphoric acid and 200 ml. of 1,2-dichloroethane were charged to a 300 ml. four necked flask as shown in Example 2, the compounds were cooled to a temperature of −5° to 5° C. and were mixed by sufficient agitation. To the resulting solution was slowly added 22.0 g. of methylene sulfate from which sulfuric acid had been completely removed. After the addition, the solution was agitated at the same temperature for three hours to complete the reaction. The reaction product was washed with water after the completion of the reaction and dried to obtain 63.2 g. of tetraethyl methylene bis-thiophosphoric ester having the following properties: B.P. 142° to 148° C./0.04 mm. Hg; refractive index $n_D^{25}$ 1.5431; specific gravity 25/25° C. 1.2338.

The poisonous effect of tetraethyl methylene bis-dithiophosphate obtained in Example 4 of the present invention on harmful rice plant insects and fruit tree mites is shown as follows:

TABLE I.—RESULTS OF TESTS ON HARMFUL RICE PLANT INSECTS

| Test Compound | Conc. (percent) | Harmful Insect ||||||||
|---|---|---|---|---|---|---|---|---|
| | | White back plant hopper |||| Small brown plant hopper ||||
| | | Control (percent) ||||||||
| | | Days after control |||| Days after control ||||
| | | 3 | 5 | 7 | 12 | 3 | 5 | 7 | 12 |
| Compound in Example 4 | 0.050 | 97.2 | 100.0 | 99.4 | 90.4 | 97.6 | 100.0 | 100.0 | 81.0 |
| | 0.025 | 96.1 | 99.0 | 98.0 | 84.0 | 90.0 | 100.0 | 100.0 | 85.7 |
| Ethion | 0.050 | 98.0 | 99.0 | 99.3 | 88.0 | 96.0 | 100.0 | 100.0 | 88.3 |
| | 0.025 | 97.0 | 98.3 | 99.0 | 82.5 | 97.0 | 100.0 | 100.0 | 94.0 |

In this table, the tests were carried out by covering a paddy field with 1/1000 or 1/2000 solution of emulsion having the following composition in an amount of 120 liters of solution per 3.3 square meters of surface area and the results of comparative tests with Ethion were also shown.

Composition of emulsion

Component: Percent by weight
Tetraethyl methylene bis-dithiophosphoric ester
  in Example 4 _____ 50
Toxanon 847.—Nonion type surface active
  agent obtained by polymerizing ethylene
  glycol with propylene oxide _____ 15
Solvent naphtha _____ 34.5
Epichlorhydrin _____ 0.5

TABLE II.—RESULTS OF TESTS ON FRUIT TREE MITES

| Test Compound | Conc. (percent) | Strain of Mites ||
|---|---|---|---|
| | | Apple tree mite | Citrus rust mite |
| | | Control (percent) ||
| | | After 24 hrs. | After 24 hrs. |
| Compound in Example 4 | 0.050 | 100 | 100 |
| | 0.025 | 90 | 98 |
| Ethion | 0.050 | 100 | 100 |
| | 0.025 | 89 | 94 |

What we claim is.

1. A process for the production of tetraethyl methylene bis-dithiophosphate which comprises reacting a compound selected from the group consisting of diethyl dithiophosphoric acid and the alkali metal and ammonium salts thereof with methylene sulfate, the reaction being conducted at a temperature of about −10° C. to about 10° C.

2. The process as defined in claim 1 wherein the methylene sulfate is formed in situ by the reaction of paraformaldehyde and fuming sulfuric acid.

3. The process as defined in claim 1 wherein the methylene sulfate is formed in situ by the reaction of sulfuric anhydride and formaldehyde.

4. The process as defined in claim 1 wherein the methylene sulfate is formed in situ by the reaction of paraformaldehyde and sulfuric anhydride.

5. A process for the production of tetraethylmethylene bis-dithiophosphate which comprises reacting a compound selected from the group consisting a diethyl dipthiophosphoric acid, and alkali metal and ammonium salts thereof with methylene sulfate, said reaction being conducted at a temperature of from about −10° C. to about 10° C. in the presence of a solvent inert to the reaction.

No references cited.

CHARLES B. PARKER, *Primary Examiner.*

A. H. SUTTO, *Assistant Examiner.*